United States Patent [19]
Slaugh

[11] Patent Number: 5,128,402
[45] Date of Patent: Jul. 7, 1992

[54] MELT STABILIZED POLYKETONE BLEND CONTAINING A MIXTURE OF MAGNESIUM OXIDE AND TITANIUM OXIDE

[75] Inventor: Lynn H. Slaugh, Houston, Tex.

[73] Assignee: Shell Oil Company, Houston, Tex.

[21] Appl. No.: 738,405

[22] Filed: Jul. 31, 1991

[51] Int. Cl.$^5$ .............................................. C08K 3/22
[52] U.S. Cl. .................................. 524/430; 524/433
[58] Field of Search ............................ 524/433, 430

[56] References Cited

U.S. PATENT DOCUMENTS

| | | |
|---|---|---|
| 2,495,286 | 1/1950 | Brubaker et al. ............... 260/63 |
| 3,694,412 | 9/1972 | Nozaki ........................ 260/63 CQ |
| 4,761,448 | 8/1988 | Kluttz et al. ................ 524/381 |
| 4,822,871 | 4/1989 | Klingensmith ................ 528/392 |
| 4,843,144 | 6/1989 | Van Broekhoven et al. ..... 528/392 |
| 4,880,865 | 11/1989 | George ........................ 524/449 |
| 4,954,552 | 9/1990 | Smutny ........................ 524/356 |
| 4,954,555 | 9/1990 | Smutny et al. ................ 524/399 |
| 4,999,399 | 3/1991 | Smutny ........................ 525/185 |
| 5,028,652 | 7/1991 | Smutny et al. ................ 524/434 |
| 5,049,630 | 9/1991 | Smutny ........................ 525/539 |

FOREIGN PATENT DOCUMENTS

| | | |
|---|---|---|
| 0121965 | 3/1984 | European Pat. Off. . |
| 0181014 | 9/1985 | European Pat. Off. . |
| 0213671 | 8/1986 | European Pat. Off. . |
| 0257663 | 5/1987 | European Pat. Off. . |
| 1081304 | 2/1966 | United Kingdom . |

OTHER PUBLICATIONS

Journal of Polymer Science: Part A: Polymer Chemistry, vol. 24, 3191–3199 (1986).
New Trends in the Photochemistry of Polymers, R. Gooden, M. Y. Hellman, D. A. Simoff and F. H. Winslow, pp. 159–169.
J. Catal., 53, 1 (1978) Journal of Catalysis.

Primary Examiner—Paul R. Michl
Assistant Examiner—Tae H. Yoon
Attorney, Agent, or Firm—James O. Okorafor

[57] ABSTRACT

A stabilized polymer composition comprising a linear alternating polymer of carbon monoxide and at least one ethylenically unsaturated hydrocarbon, and a melt stabilizer comprising oxides of magnesium and titanium. A process of preparing the composition and articles of manufacture made of the composition are also disclosed.

13 Claims, No Drawings

MELT STABILIZED POLYKETONE BLEND CONTAINING A MIXTURE OF MAGNESIUM OXIDE AND TITANIUM OXIDE

FIELD OF THE INVENTION

This invention generally relates to polyketone polymers. More particularly, this invention relates to a stabilized polyketone polymer composition comprising the polymer and a melt stabilizing agent.

BACKGROUND OF THE INVENTION

Polymers of carbon monoxide and olefins generally referred to as polyketones are well known in the art. Such polymers are disclosed in, for example U.S. Pat. No. 2,495,286, 3,694,412 and U.K. 1,081,304 which are herein incorporated by reference.

Of particular interest among polyketone polymers, is the class of linear alternating polymers of carbon monoxide and at least one ethylenically unsaturated hydrocarbon. This type of polymers is disclosed in European Patent applications such as Nos. 121,965, 181,014, 213,671, and 257,663 which are herein incorporated by reference. Additionally, this class of polymers is disclosed in numerous U.S. patents assigned to Shell Oil Company, exemplified by U.S. Pat. Nos. 4,880,865 and 4,822,871 which are herein incorporated by reference.

Polyketone polymers have relatively high molecular weights and are used in the production of shaped articles, such as containers for food and drink and parts for the automotive industry, which are produced by processing the polyketone according to well known methods.

It is known that polyketone polymers have stability problems. See for example R. Gooden, et.al., *Journal of Polymer Science: Part A: Polymer Chemistry*, Vol 24, 3191-3199 (1986) and R. Gooden, et.al., *New Trends in the Photochemistry of Polymers*, Applied Science p. 159 (1985).

These stability problems include ultraviolet (UV), melt stability, and heat aging stability, sometimes also referred to as continuous use temperature (CUT). While antioxidants and other additives provide some degree of improvement, it would be of advantage to provide new techniques and materials which yield further improvements in thermal oxidative stability of linear alternating polymers of carbon monoxide and at least one ethylenically unsaturated hydrocarbon. For most polymers including polyketones, thermal oxidative degradation leads to chain scission, reduction in molecular weight, and loss of physical properties. These adverse effects of oxidative chain scission reactions are undesirable, and continue to present a problem to those of skill in the art. Thus, there continues to exist the need to produce ethylene-CO polymers that have and exhibit superior melt stability properties.

It is a discovery of this invention that addition of oxides of magnesium and titanium to a polyketone polymer composition result in an improvement in the melt stability of the composition.

SUMMARY OF THE INVENTION

It is a general object of this invention to provide a stabilized polyketone blend.

It is a particular object of this invention to produce a melt stabilized polyketone blend.

It is a further object of this invention to provide a stabilized polyketone blend having a good balance of properties.

In accordance with this invention, it is now provided a melt stabilized polyketone blend, comprising a major portion of a linear alternating polymer of carbon monoxide and at least one ethylenically unsaturated hydrocarbon, and a minor portion of oxides of magnesium and titanium in an amount sufficient to function as a melt stabilizer.

DETAILED DESCRIPTION OF THE INVENTION

The material useful in practicing this invention include a linear alternating polymer of carbon monoxide and at least one ethylenically unsaturated hydrocarbon (simply referred to as a polyketone polymer), and a melt stabilizing agent comprising oxides of magnesium and titanium. In general, the practice of this invention involves suitably admixing suitable quantities of the useful material to form a melt stabilized polyketone polymer composition.

During melt processing, the neat polyketone polymer exhibits an undesirable viscosity increase. It is most desirable for a thermoplastic polymer to have little or no viscosity increase during processing. Most commercial-grade engineering thermoplastics exhibit little or no change in viscosity during melt processing because of the presence of an additive package selected to minimize such a change in properties. This invention stabilizes the polyketone polymers so that they remain unchanged upon being subject to conditions which would otherwise bring about a change in their properties. This object is accomplished by admixing the inventive stabilizing agent with the polyketone polymer.

The inventive stabilizing agent generally contains a mixture of oxides of magnesium and titanium preferably prepared by the method subsequently disclosed herein. The addition of the stabilizing agent to the polyketone polymer results in an improved melt stabilized composition. This improvement in melt stability is evidenced by a relatively constant apparent crystallinity when subjected to melt processing operations of melting and solidification (crystallization). this improvement in retained apparent crystallinity offers considerably advantages which are not to be found when unstabilized polymers are utilized. For example, the stabilized composition is often formed as nibs by passage through an extruder. The nibs are then injection molded to produce a shaped article, in each case without substantial decrease in crystallinity as determined by a relatively constant melting point or other related physical property. The compositions of the invention are particularly useful in this and other applications which require a series of melting and solidifictions cycles. While the compositions of the invention are usefully processed by conventional techniques which do not involved melting and solidification of the polymer the advantages of the stabilized compositions are most apparent when melt processing operations are to be employed. Thus, the compositions of the invention are useful in a variety of applications ad engineering thermoplastics but are particularly useful in the production of shaped articles requiring a number of melting/solidification cycles. Illustrative of such articles are containers for food and drink and parts and housings for automotive applications.

The polymer of the invention, the inventive stabilizing agent, conventional agents typically useful in the formulation of the inventive composition, and a process for producing the stabilized polyketone polymer of the invention are discussed in more details in various sections of this specification.

THE POLYMER

The polyketone polymers which are employed as the major component of the melt stabilized polymer composition of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexane, 1-octene and 1-dodecene, or are arylaliphatic containing an aryl substituent on an otherwise aliphatic molecule, particularly an aryl substituent on a carbon atom of the thylenic unsaturtion. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocabon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

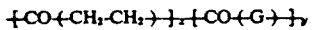

where G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e., terpolymers are employed, the —CO—(CH₂CH₂)— units and the —CO—(G)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerably extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in s standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,834,144 (Van Broekhoven et.al.). The carbon monoxide and hydrocarbon nonowner(s) are contacted under polymerization conditions in the presence of a catalyst compositions formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without washing to be limited, a preferred palladium compound is a palladium carboxylate, particularly palladium acetate, a preferred anion is the anion of trifluoroacetic acid or p-toluenesulfoncic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkaolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

Melt Stabilizing Agent

The melt stabilizing agent comprises a mixture of oxides of magnesium and titanium preferably prepared in the manner disclosed herein.

Preparation of Magnesium Hydroxide

A stirred solution of 100g (492 m mole) of magnesium chloride hexahydrate (Aldrich, A. C. S. reagent) in 300 ml of deionized water was treated, dropwise, over a 15 min. period with 28% ammonium hydroxide to a final pH of 9.6. The resulting suspension was stirred for an additional 1.5 hr. and then filtered to collect the precipitated solids.

The solids were washed with deionized water until no chloride was detected in the filtrates (by testing with silver nitrate solution) and then dried in the vacuum oven for 16 hr. at 110° C. under a slow stream of nitrogen.

Preparation of Titanic Acid

Ammonium hydroxide (28&) was added dropwise to a stirred suspension of 13.0 g (1-03 mole) of titanium nitrate (Pfaltz & Bauer, 99.6%) in 300 ml of deionized water at room temperature to a final pH of 9.4. The reaction mixture was stirred for an additional 5 hr. at room temperature and centrifuged to separate the solids from the supernatant. The solids were washed several times with fresh deionized water and then dried at 100° C. under a slow preparation stream of nitrogen in the vacuum oven for 16 hr.

Preparation of TiO$_2$-MgO

A mixture of 0.75 g (6.6 m mole) of a freshly prepared titanic acid, 2.25 g (38.6 m mole) of freshly prepared magnesium hydroxide and a few drops of deionized water were combined in a water. The mixture was kneaded together over a 2 hr. period to make a thick paste and then dried in the vacuum oven at 100° C. under a slow stream of nitrogen for 16 hr.

The solids were calcined in the muffle furnace over 2 hr. to 200+ C. and ground to a fine powder. Analysis by plasma emission found: Mg, 39.0 wt %; Ti, 18.0 wt %, Na, 45 ppm. The weight ratio of ti/Mg was 1/2.17 and the weight ratio of TiO$_2$/MgO was 1/4.27.

Melt stabilizing compositions with different ratios of TiO$_2$/MgO can be made by varying the ratio of titanic acid to magnesium hydroxide which are kneaded together [J. Catal., 53,1(1978) Journal of Catalysts.]

Other Additives

The melt stabilized polymer composition of the invention may also include other additives such as antioxidants, dyes, other fillers or reinforcing agent, fire resistant materials, mold release agent, colorants and other materials designed to improve the processability of the polymers or the properties of the resulting compound. Such additives are added prior to, together with, or subsequent to the blending o the polyketone and the melt stabilizing agent.

Amounts and Process

The melt stabilized polymer composition of this invention comprises a major amount of liner alternating polymer of carbon monoxide and at least one ethylenically unsaturated hydrocarbon and a lesser amount of the melt stabilizing agent. Generally speaking, at least up to one weight percent (1wt %) of the melt stabilizing agent is desired. This quantity of melt stabilizing agent can be made up from various permutation of oxides of magnesium and titanium previously disclosed. For example, 0.75 wt % magnesium oxide and 0.25 wt % titanium oxide, or a 0.50 wt % of each of these oxides may be used.

The method of producing the melt stabilized polymer composition of this invention is not critical so long as a relatively uniform distribution of the melt stabilizer throughout the polyketone is obtained. Conventional mixing devices and/or procedures known in the art are suitable for admixing the components of this invention.

The following examples and table further illustrates the various aspects of the invention.

EXAMPLE 1

Preparation of Polymer

A linear alternating terpolymer of carbon monoxide, ethylene, and propylene was produced in the presence of a catalyst composition formed from palladium acetate, trifluoroacetic acid and 1,3-bis[di(2-methoxyphenyl)phosphino]propane. The polyketone polymer had a melting point of about 223° C. and a LVN of about 1.1 dg/g when measured in m-cresol at 60° C.

EXAMPLE 2

Preparation of Inventive Samples and Testing of Viscosity Properties of Samples A portion of the polymer of Example 1 was ground to 60 mesh, and then powder-mixed with magnesium oxide-titanium oxide compositions in a Henschel mixer for 5 minutes. Polymer samples containing magnesium oxide-titanium oxide in various ratios of the two components were prepared, as shown in Table I. The samples were compounded in a ¾ inch Braebender single screw extruder, operating at 60 to 100 rpm with melt temperature between 230° and 250° C. The viscosity of each sample was determined over time in the melt in a Rheometrics parallel plate rheometer operated at 275° C. Table I lists the initial melt viscosity and the viscosity after 10 and 28 minutes. During commercial processing, polymers are typically in a melt phase for less than 10 minutes.

TABLE I

| MgO (wt %) | TiO$_2$ (wt %) | Total MgO + TiO$_2$ | Viscosity (Pa-sec) 0 min. | 10 min. | 28 min. |
|---|---|---|---|---|---|
| 0 | 0 | 0 | 990 | 10,200 | 30,900 |
| .75 | .25 | 1 | 990 | 8,877 | 28,140 |
| .50 | .50 | 1 | 990 | 7,989 | 24,300 |
| .25 | .75 | 1. | 990 | 8,166 | 26,700 |

The results of Table I demonstrate that the magnesium oxide-titanium oxide composition is an effective agent for decreasing the viscosity increase of the polyketone polymer melt. With the magnesium oxide-titanium oxide stabilizers incorporated, the viscosity of the samples after 10 minutes and 28 minutes of heating is always less than that of samples without these stabilizers.

While this invention has been described in detail for the purpose of illustration, it is not to be construed as limited thereby but is intended to cover all changes and modifications within the spirit and scope thereof.

What which is claimed is:

1. A melt stabilized polymer composition comprising:
   (a) a linear alternating polymer of carbon monoxide and at least one ethylenically unsaturated hydrocarbon; and
   (b) a mixture of oxides of magnesium and titanium in an amount sufficient to function as a melt stabilizer.

2. A composition as in claim 1 wherein the linear alternating polymer is represented by the repeating formula

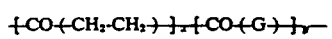

3. A composition as in claim 1 wherein said oxides of magnesium and titanium are present in an amount of from about 0.01 up to about 1 wt %.

4. A composition as in claim 1 wherein said magnesium oxide and titanium oxide are present in an amount of about 0.75 wt % and 0.25 wt % respectively.

5. A composition as in claim 1 wherein said magnesium oxide and titanium oxide are each present in an amount of about 0.5 wt %.

6. A composition as in claim 1 wherein said magnesium oxide and titanium oxide are present in amount of about 0.25 wt % and 0.75 wt % respectively.

7. A composition as in claim 1 wherein the weight ratio of magnesium oxide: titanium oxide is from about 1:0.2 to about 1:10.

8. A melt stabilized polymer composition comprising:
(a) a linear alternating polymer of carbon monoxide and at least one ethylenically unsaturated hydrocarbon; and
(b) 0.5 wt % each of magnesium oxide and titanium oxide.

9. A shaped article of manufacture produced from the composition of claim 1.

10. A composition as in claim 3 wherein said oxides of magnesium and titanium are present in an amount of from about 0.1 to 1 wt %.

11. A composition as in claim 3 wherein said oxides of magnesium and titanium are present in an amount of from about 0.5 to 1 wt %.

12. A composition as in claim 1 wherein said polymer is a terpolymer of carbon monoxide, ethylene, and a second ethylenically unsaturated hydrocarbon.

13. A composition as in claim 12 wherein said second ethylenically unsaturated hydrocarbon is propylene.

* * * * *